US011929889B2

(12) United States Patent
Phillips et al.

(10) Patent No.: US 11,929,889 B2
(45) Date of Patent: Mar. 12, 2024

(54) CONNECTION MANAGEMENT BASED ON SERVER FEEDBACK USING RECENT CONNECTION REQUEST SERVICE TIMES

(71) Applicant: International Business Machines Corporation, Armonk, NY (US)

(72) Inventors: Lloyd Phillips, Austin, TX (US); Anil Kalavakolanu, Austin, TX (US); Teresa H. Pham, Cedar Park, TX (US); Mathew Accapadi, Cedar Park, TX (US); Vani D. Ramagiri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/146,278

(22) Filed: Sep. 28, 2018

(65) Prior Publication Data

US 2020/0106681 A1    Apr. 2, 2020

(51) Int. Cl.
*H04L 41/5009*    (2022.01)
*H04L 43/0805*    (2022.01)
*H04L 47/70*    (2022.01)
*H04L 67/14*    (2022.01)
*H04L 67/61*    (2022.01)
*H04L 67/63*    (2022.01)

(52) U.S. Cl.
CPC ...... *H04L 41/5009* (2013.01); *H04L 43/0805* (2013.01); *H04L 47/826* (2013.01); *H04L 67/14* (2013.01); *H04L 67/61* (2022.05); *H04L 67/63* (2022.05)

(58) Field of Classification Search
CPC ..... H04L 41/5009; H04L 67/63; H04L 67/61; H04L 43/0805; H04L 47/826; H04L 67/14
See application file for complete search history.

(56) References Cited

U.S. PATENT DOCUMENTS

| 6,047,309 | A | * | 4/2000 | Dan | H04N 7/17318 |
| | | | | | 709/201 |
| 7,062,567 | B2 | * | 6/2006 | Benitez | G06F 8/65 |
| | | | | | 709/217 |
| 7,346,691 | B2 | | 3/2008 | Peiffer | |
| 7,480,711 | B2 | | 1/2009 | Lownsbrough et al. | |
| 9,379,997 | B1 | | 6/2016 | Vosshall et al. | |
| 2002/0141353 | A1 | * | 10/2002 | Ludwig | H04L 47/10 |
| | | | | | 370/254 |

(Continued)

OTHER PUBLICATIONS

Eggert et al., "TCP User Timeout Option", Internet Engineering Task Force, Network Working Group, Request for comments 5482, Mar. 2009 (Year: 2009).*

(Continued)

*Primary Examiner* — Joseph A Bednash
(74) *Attorney, Agent, or Firm* — CANTOR COLBURN LLP; Nathan Rau (57) ABSTRACT

A method for managing network service response times by a client device is provided. The client device determines whether a network service of a service provider is reachable or active and determines a service response time of the service provider. The client device communicates to the service provider a request to establish a conditional connection based on an average accept service time of a connection and a maximum service response time.

6 Claims, 5 Drawing Sheets

(56) References Cited

U.S. PATENT DOCUMENTS

| | | | |
|---|---|---|---|
| 2004/0111652 A1* | 6/2004 | Shoaib | H04L 41/0654 |
| | | | 714/15 |
| 2005/0021999 A1* | 1/2005 | Touitou | H04L 69/16 |
| | | | 726/11 |
| 2005/0240673 A1* | 10/2005 | Yoneda | H04L 43/0811 |
| | | | 709/229 |
| 2006/0085559 A1 | 4/2006 | Lownsborough et al. | |
| 2006/0089996 A1 | 4/2006 | Peiffer | |
| 2007/0300290 A1* | 12/2007 | Shay | H04L 63/0428 |
| | | | 370/392 |
| 2012/0124431 A1* | 5/2012 | Bauer | H04L 69/28 |
| | | | 714/55 |
| 2014/0280768 A1* | 9/2014 | Calo | H04L 69/16 |
| | | | 709/219 |
| 2017/0208498 A1* | 7/2017 | Lee | H04W 76/19 |
| 2017/0250886 A1* | 8/2017 | Leitner | H04L 61/2007 |

OTHER PUBLICATIONS

Information Sciences Institute University of Southern California, Transmission Control Protocol DARPA Internet Program Protocol Specification, Sep. 1981, RFC 793 (Year: 1981).*

Duke et al.; "A Roadmap for Transmission Control Protocol (TCP)"; NetApp, Inc.; 58 Pages.

* cited by examiner

CONNECTION MANAGEMENT BASED ON SERVER FEEDBACK USING RECENT CONNECTION REQUEST SERVICE TIMES

BACKGROUND

The disclosure relates generally to network connections, and more specifically, to connection management based on server feedback using recent connection request service times.

In general, problems exist with respect to network connections between clients and servers. One of these problems is when a client is attempting to make a connection with a server via a connection request, the client may not receive an immediate response. When the client does not receive an immediate response, the client does not know or cannot identify why the immediate response was not received. For instance, the client cannot ascertain whether the server is reachable (e.g., did the connection request make it to the server?) or when is the server going to respond when the server is reachable (e.g., will the response come late?).

SUMMARY

According to one or more embodiments, a method for managing network service response times by a client device is provided. The client device determines whether a network service of a service provider is reachable or active and determines a service response time of the service provider. The client device communicates to the service provider a request to establish a conditional connection based on an average accept service time of a connection and a maximum service response time.

According to one or more embodiments, a computer program product for managing network service response times is provided. The computer program product includes a computer readable storage medium having program instructions embodied therewith. The program instructions executable by a processor of a client device. The client device determines whether a network service of a service provider is reachable or active and determines a service response time of the service provider. The client device communicates to the service provider a request to establish a conditional connection based on an average accept service time of a connection and a maximum service response time.

According to one or more embodiments, a system for managing network service response times is provided. The system includes a client device in communication with a service provider. The client device determines whether a network service of a service provider is reachable or active and determines a service response time of the service provider. The client device communicates to the service provider a request to establish a conditional connection based on an average accept service time of a connection and a maximum service response time.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, conventional load boundaries are mechanisms that attempt to guess and evenly distribute loads across servers with respect to connection requests from clients. Yet, conventional load boundaries are unable to determine how fast the servers can respond. Alternatively, conventional TCP servers set a TCP listener backlog to a very high value, such that connections at the TCP level complete. The problem with setting the TCP listener backlog to the very high value is that a connection backlog accumulates and waits to be serviced by applications of the servers, which in turns overloads the applications and prevents responding to the connection requests.

Turning now to an overview of the aspects of the invention, one or more embodiments of the invention address the above-described shortcomings of the prior art by enabling client devices to know how servers of a service provider are operating. For instance, embodiments disclosed herein may include system, method, and/or computer program product (herein a system) that manages a network service response time, using recent connection request times to manage connections based on server feedback. Technical effects and benefits of the system include the client devices being in control connections with respect to the network service response time. Thus, embodiments described herein are necessarily rooted in a processor of the client device to perform proactive operations to overcome problems specifically arising in the realm of network connections.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
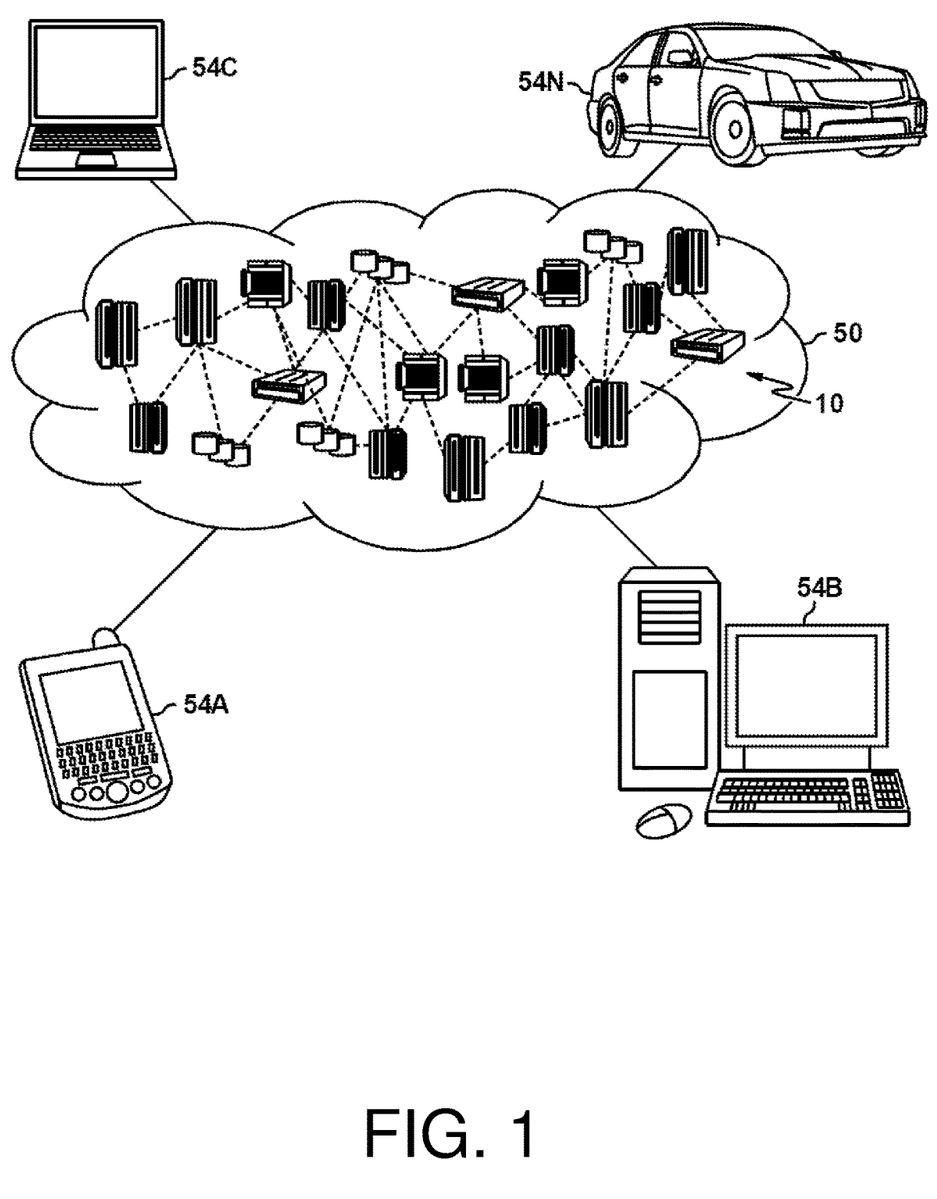
FIG. 1 depicts a cloud computing environment in accordance with one or more embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
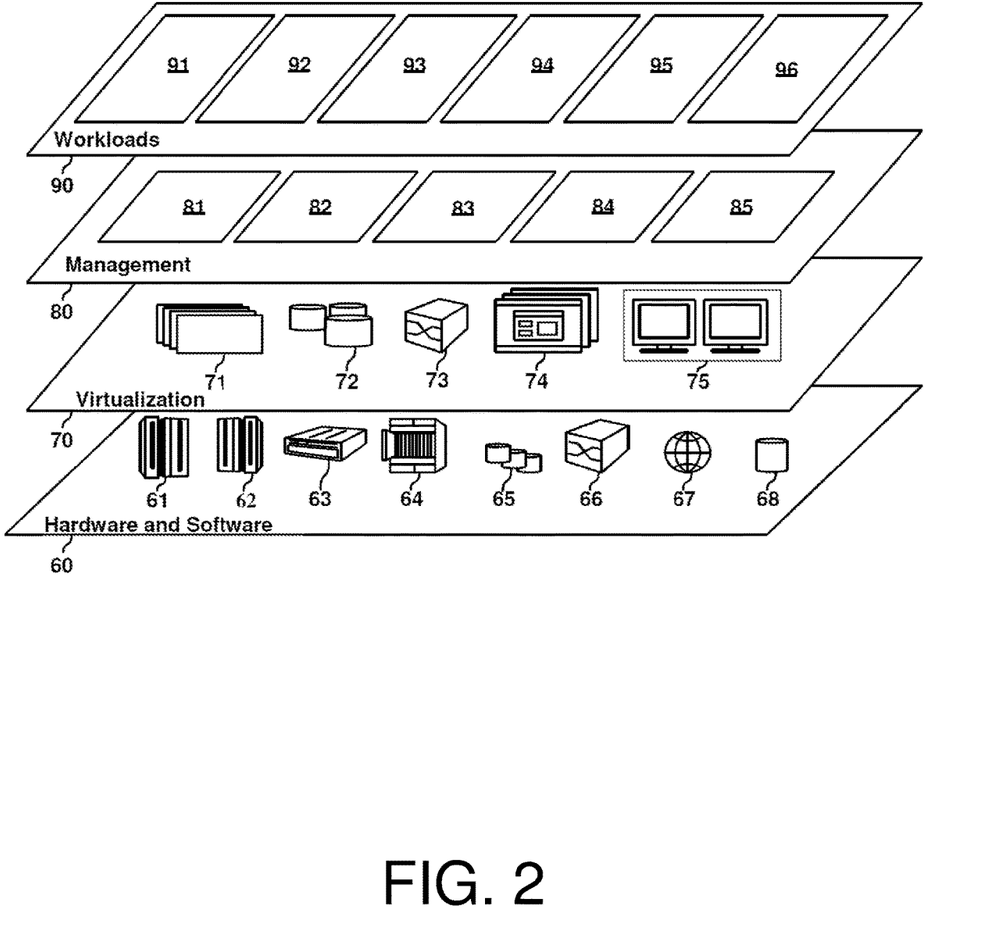
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network service response times managing 96.

Figure 3:
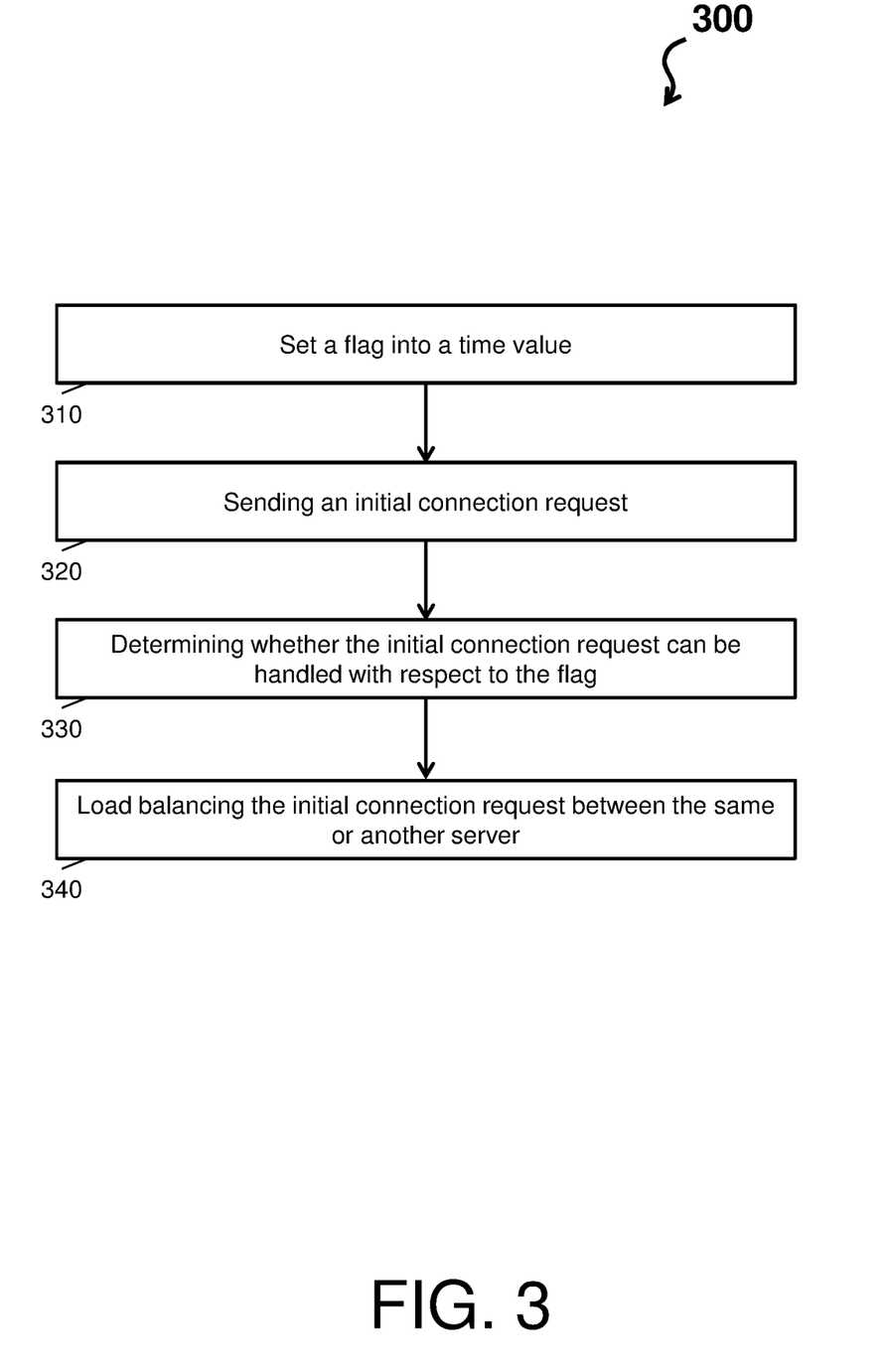
FIG. 3 depicts a process flow in accordance with one or more embodiments.

Turning now to FIG. 3, a process flow 300 is generally shown in accordance with an embodiment. The process flow 300 can be implemented by an electronic, computer framework comprising and/or employing any number and combination of computing device and networks utilizing various communication technologies, as described herein with respect to FIGS. 1-2. For example, the process flow 300 can be implemented by a client device and a server attempting to establish a connection. More particularly, the process flow 300 can be implemented between a client application of the client device and an application or a network service provided by the server of a service provider.

The process flow 300 begins at block 310, client device sets a flag to a time value. The time value indicates of how long the client device is willing to wait for the connection to be handed to the application. The flag can be set in an initial connection request (e.g., a TCP synchronize (SYN) packet).

At block 320, the client device sends the initial connection request to the server. The initial connection request sets a conditional connection with the server.

At block 330, the server determines whether the initial connection request can be handled with respect to the flag (within the time value). If the server can handle the initial connection request (e.g., can handle the flag by processing the initial connection request within the time value), the server ignores the flag and processes the initial connection request as normal. Processing the initial connection request as normal includes sending and acknowledgment (ACK) packet to the client. However, if the server cannot handle the initial connection request (e.g., cannot handle the flag by processing the initial connection request within the time value), the conditional connection is reset by the server TCP stack. The reset (RST) packet includes a service response time value which is available to client.

At block 340, the client device, using the service response time value can load balance the initial connection request between the same or another server. That is, with the TCP socket being closed with respect to the initial connection request, the client device now knows that the server is reachable (e.g., the client device can determine whether a network service of a service provider is reachable or active). Further, by receiving the current service time, the client device now knows a service response time (e.g., the client device can determine a service response time of the service provider). In turn, the client device can retry the same server or send another initial connection request to a new server (e.g., the client device communicates to the server a request to establish a conditional connection). Note if the client has historically determined the server supports the "flag and initial connection request" and a response packet (SYN/ACK or RST) is not received by the client device within normal network latency, the client may assume the network and/or server is DOWN without waiting for the normal TCP SYN timeout. This is a major feature of the embodiments herein, as it provides a means for client to immediately try any alternate server.

Figure 4:
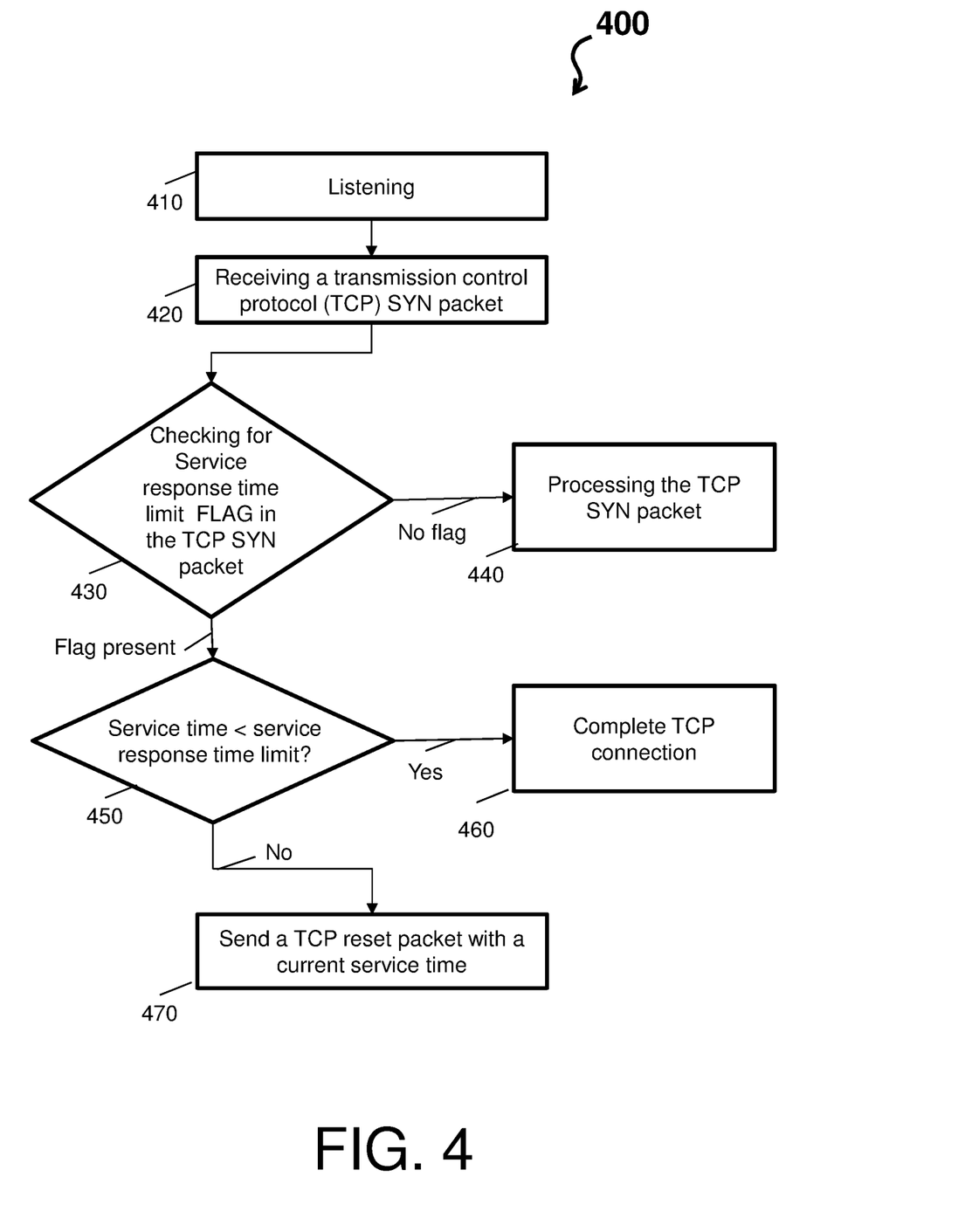
FIG. 4 depicts a process flow in accordance with one or more embodiments.

FIG. 4 depicts a process flow 400 in accordance with one or more embodiments. For example, the process flow 400 can be implemented by a server attempting to establish a connection via a three-way TCP handshake.

The process flow 400 begins at block 410, where the server listens for incoming TCP SYN packet, from a client device. At block 420, the server receives a TCP SYN packet. At decision block 430, the server identifies a flag status of the TCP SYN packet. If the TCP SYN packet does not include a flag, the process flow 400 proceeds to block 440 (as indicated by the 'No flag' arrow). At block 440, the server processes the TCP SYN packet (e.g., in a conventional manner). If the TCP SYN packet includes a flag, the process flow 400 proceeds to decision block 450 (as indicated by the 'Flag present' arrow).

At decision block 450, the server determines if the TCP SYN packet can be processed with a time value. More particularly, the server determines whether the TCP SYN packet can be processed and a connection established within a time value indicated by the flag. If the server can handle the flag within the time value, the process flow 400 proceeds to block 460 (as indicated by the 'Yes' arrow). At block 460, the server sends an accept packet or an ACK packet to the client device (e.g., complete TCP accept( ). Next, the process flow 400 proceeds to block 440, where the server processes the TCP SYN packet. If the server cannot handle the flag within the time value, the process flow 400 proceeds to block 470 (as indicated by the 'No' arrow). At block 470, the server sends a TCP RESET packet to the client device that includes a current service response time of the server.

Figure 5:
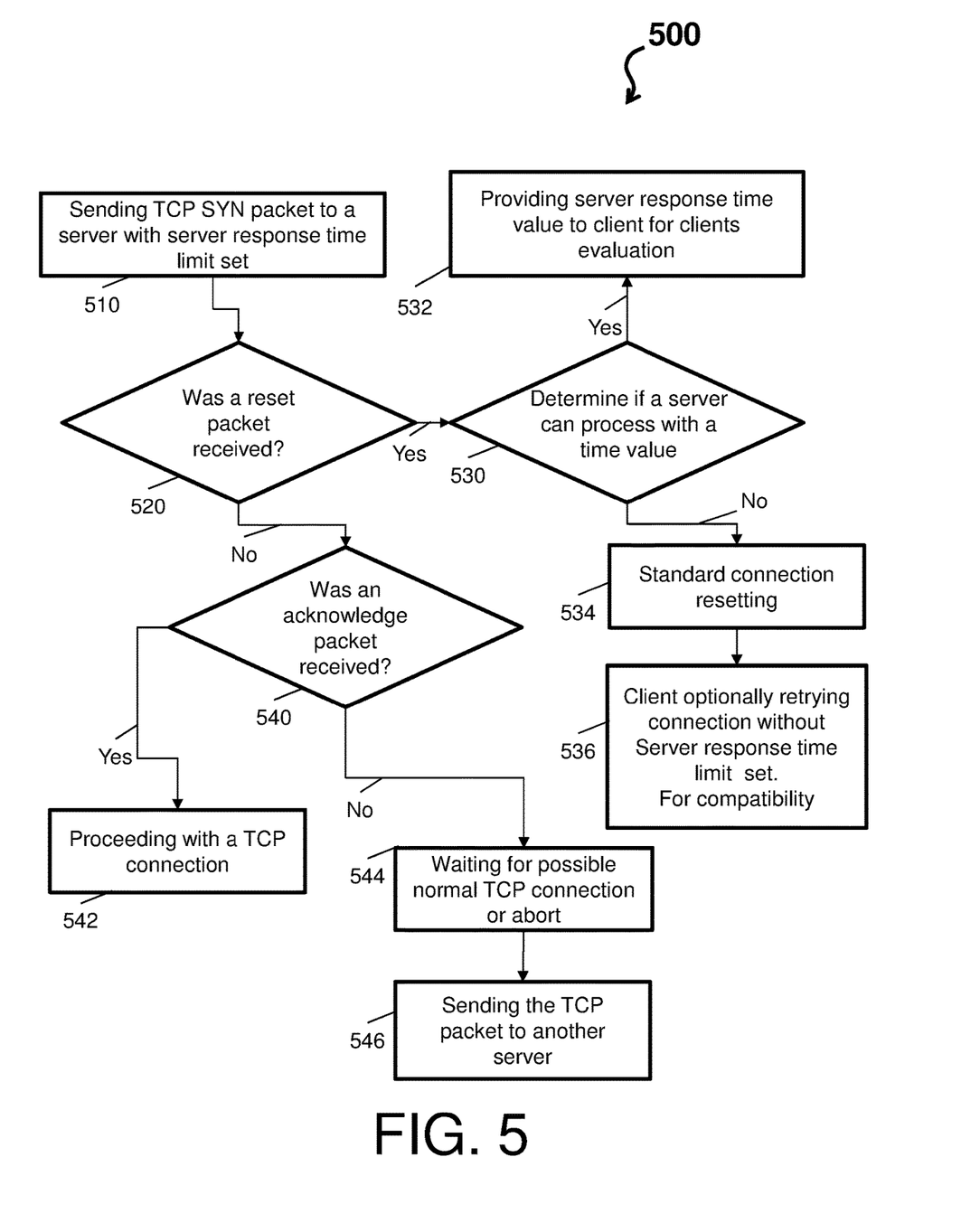
FIG. 5 depicts a process flow in accordance with one or more embodiments.

FIG. 5 depicts a process flow 500 in accordance with one or more embodiments. For example, the process flow 500 can be implemented by a client device attempting to establish a connection via a three-way TCP handshake.

At block 510, the client device sends a TCP SYN packet with a flag set to a desired service response limit time value. In accordance with one or more embodiments, the client device sends the TCP SYN packet with the flag and a service response limit time to server). The TCP SYN packet is an attempt to establish a conditional connection with the server. The client device then waits for a response packet. At decision block 520, the client device determines whether a reset packet was received. If the reset packet was received, the process flow 500 proceeds to block 530 (as indicated by the 'Yes' arrow). Note that the reset packet may include a current service time of the server (flag).

At decision block 530, the connection attempt has been reset but the client is provided a means to determine if server has set a service response time (e.g., TCP stack checks a RST packet to see if it contains the flag). If the server has set service response time value flow 500 proceeds to block 532. At block 532, the client retrieves server response time. Using this information the client device may perform any number of actions such trying alternate servers using same response time limit or looping through a list of servers increasing the service response time limit each iteration. The invention does not put restrictions on how the server response information can be creatively used by client application code. In accordance with one or more embodiment, at block 532, the client device can inspect the delay/service time returned in the RST packet so that the client device can control and decide what to do: A) retry same server with longer service response limit time; B) try another server with same service response limit time; C) Loop through list of servers increasing service response limit time; D) Wait and try servers again at a later time; or E) take unspecified custom action based on actual server service response time feedback. Note that block 510 is an entry point for any retry.

Returning to block 530, if the server reset packet does not contain service response time flag flow 500 proceeds to block 534 for traditional TCP reset handing. Further, at block 534, the RST packet is processed per traditional TCP rules and client knows the connect request failure can be an ordinary TCP RST (no server listener at this address/port) or the server cannot handle the flag (e.g., client can try again using standard SYN (no flag)). Note that this provides compatibility with standard TCP environment). Block 536 shows how client can handle a server that does not handle the service response time limit flag. The client may optionally retry the connection TCP SYN without the flag providing compatibility with conventional TCP servers and firewalls.

Returning to decision block 520, if the reset packet was not received, the process flow 500 proceeds to block 540 (as indicated by the 'No' arrow). At decision block 540, the client device determines whether an acknowledge packet was received. If the acknowledge packet was received, the process flow 500 proceeds to block 542 (as indicated by the 'Yes' arrow). At block 542, the client device proceeds with a TCP connection.

If the acknowledge packet was not received, the process flow 500 proceeds to block 544 (as indicated by the 'No' arrow). At block 544, if the client device historically knows the server supports service response time it does not have to wait for the normal TCP SYN/SYN-ACK timeout but after normal network latency period infer either server or network are unresponsive and immediately try an alternate server (e.g., the client device can abort the connection attempt or just wait and see if it ever connects). This is significant since a traditionally overloaded TCP server will not respond (no SYN-ACK) leaving client to speculate on whether server is overloaded or network trouble exits. At block 546, the client device sends the TCP packet to another server. This the end of connect call by the client device. A new call would start at block 510.

Accordingly, the technical effects and benefits of embodiments herein include an application or a network service provided by a server of a service requiring no modification; a server TCP stack maintaining a service response time and resets connections without server application or a network service participation; a mix of traditional and enhanced client/server systems co-existing, and utilization of service response time by the client side in an unlimited number of ways.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing network service response times by a client device comprising a processor and a memory, the method comprising:

communicating, by the client device to a service provider, a request to establish a connection via a TCP synchronize (SYN) packet, wherein the TCP SYN packet comprises a flag indicating a service response time limit for the service provider;

determining whether a reset packet was received from the service provider, wherein the reset packet comprises an indication that the request to establish the connection has been reset, and wherein the reset packet further comprises a flag defining a current service time of the service provider that is available to the client device;

responsive to the reset packet being received by the client device:
  inspecting, by the client device, the current service time returned in the reset packet; and
  responsive to inspecting the current service time, determining, by the client device, to take an action comprising one of retrying with the service provider with a longer service response time limit and attempting a connection with another server with the service response time limit; and responsive to the reset packet not being received by the client device:
  determining, by the client device, that an acknowledge (ACK) packet was not received; and
  responsive to the client device accessing a record of a prior interaction with the service provider where the service provider supported the flag indicating a service response time limit, skipping a normal TCP SYN/SYN-ACK timeout, infer that the service provider is unresponsive, and immediately try to establish a connection with an alternate service provider, wherein the prior interaction occurred before communicating the TCP SYN packet.

2. The method of claim 1, wherein the client device comprises a transmission protocol client.

3. A computer program product for managing network service response times, the computer program product comprising a computer readable storage medium having program instructions embodied therewith, the program instructions executable by a processor of a client device to cause:
  communicating, by the client device to a service provider, a request to establish a conditional connection via a TCP synchronize (SYN) packet, wherein the TCP SYN packet comprises a flag indicating a service response time limit for the service provider;
  determining whether a reset packet was received from the service provider, wherein the reset packet comprises an indication that the request to establish the connection has been reset, and wherein the reset packet further comprises a flag defining a current service time of the service provider that is available to the client device;
  responsive to the reset packet being received by the client device:
    inspecting, by the client device, the current service time returned in the reset packet; and
    responsive to inspecting the current service time, determining, by the client device, to take an action comprising one of retrying with the service provider with a longer service response time limit and attempting a connection with another server with the service response time limit; and
  responsive to the reset packet not being received by the client device:
    determining, by the client device, that an acknowledge (ACK) packet was not received; and
    responsive to the client device accessing a record of a prior interaction with the service provider where the service provider supported the flag indicating a service response time limit, skipping a normal TCP SYN/SYN-ACK timeout, infer that the service provider is unresponsive, and immediately try to establish a connection with an alternate service provider, wherein the prior interaction occurred before communicating the TCP SYN packet.

4. The computer program product of claim 3, wherein the client device comprises a transmission protocol client.

5. A system for managing network service response times, the system comprising a client device in communication with a service provider, the client device comprising program instructions executable by a processor of the client device to cause:
  communicating, by the client device to the service provider, a request to establish a connection via a TCP synchronize (SYN) packet, wherein the TCP SYN packet comprises a flag indicating a service response time limit for the service provider;
  determining whether a reset packet was received from the service provider, wherein the reset packet comprises an indication that the request to establish the connection has been reset, and wherein the reset packet further comprises a flag defining a current service time of the service provider that is available to the client device;
  responsive to the reset packet being received by the client device:
    inspecting, by the client device, the current service time returned in the reset packet; and
    responsive to inspecting the current service time, determining, by the client device, to take an action comprising one of retrying with the service provider with a longer service response time limit and attempting a connection with another server with the service response time limit; and
  responsive to the reset packet not being received by the client device:
    determining, by the client device, that an acknowledge (ACK) packet was not received; and
    responsive to the client device accessing a record of a prior interaction with the service provider where the service provider supported the flag indicating a service response time limit, skipping a normal TCP SYN/SYN-ACK timeout, infer that the service provider is unresponsive, and immediately try to establish a connection with an alternate service provider, wherein the prior interaction occurred before communicating the TCP SYN packet.

6. The system of claim 5, wherein the client device comprises a transmission protocol client.

\* \* \* \* \*